US007676604B2

(12) United States Patent
Halleck et al.

(10) Patent No.: US 7,676,604 B2
(45) Date of Patent: Mar. 9, 2010

(54) TASK CONTEXT DIRECT INDEXING IN A PROTOCOL ENGINE

(75) Inventors: William Halleck, Lancaster, MA (US); Victor Lau, Marlboro, MA (US); Pak-Lung Seto, Shrewsbury, MA (US); Naichih (Neil) Chang, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 11/285,825

(22) Filed: Nov. 22, 2005

(65) Prior Publication Data

US 2007/0118835 A1 May 24, 2007

(51) Int. Cl.
*G06F 3/00* (2006.01)
*G06F 15/16* (2006.01)

(52) U.S. Cl. .......................................... 710/5; 709/200
(58) Field of Classification Search ...................... 710/5; 709/108
See application file for complete search history.

(56) References Cited

U.S. PATENT DOCUMENTS

| | | | |
|---|---|---|---|
| 4,805,107 A * | 2/1989 | Kieckhafer et al. ............. 714/4 |
| 5,555,402 A | 9/1996 | Tuma et al. |
| 5,577,224 A | 11/1996 | DeWitt et al. |
| 5,727,211 A * | 3/1998 | Gulsen ........................ 718/108 |
| 5,781,926 A | 7/1998 | Gaskins et al. |
| 5,802,340 A | 9/1998 | Mallick et al. |
| 5,862,406 A | 1/1999 | Matsumoto et al. |
| 5,944,816 A * | 8/1999 | Dutton et al. ................ 712/215 |
| 6,205,467 B1 * | 3/2001 | Lambrecht et al. ........... 718/108 |
| 6,418,489 B1 * | 7/2002 | Mason et al. .................. 710/22 |
| 6,430,593 B1 * | 8/2002 | Lindsley ...................... 718/103 |
| 6,790,075 B1 | 9/2004 | Sung |
| 6,843,674 B1 | 1/2005 | Young |
| 7,050,940 B2 * | 5/2006 | Basso et al. .................. 702/184 |
| 7,093,033 B2 | 8/2006 | Beckett et al. |
| 7,185,266 B2 | 2/2007 | Blightman et al. |
| 2003/0021239 A1 | 1/2003 | Mullendore et al. |
| 2003/0110325 A1 | 6/2003 | Roach et al. |
| 2003/0236952 A1 | 12/2003 | Grieff et al. |
| 2004/0019718 A1 | 1/2004 | Schauer et al. |

(Continued)

FOREIGN PATENT DOCUMENTS

WO WO-2007002804 A2 1/2007

(Continued)

OTHER PUBLICATIONS

"Non-Final Office Action for U.S. Appl. No. 11/172,715, mailed on Nov. 13, 2007", 36 Pages.

(Continued)

*Primary Examiner*—Henry W. H. Tsai
*Assistant Examiner*—Titus Wong
(74) *Attorney, Agent, or Firm*—Christopher K. Gagne

(57) ABSTRACT

A method and apparatus for managing task context are provided. Upon initialization, a protocol engine provides context resources available for processing tasks to a task issuer. Based on available context resources, the task issuer creates and manages a free list of available task context indices and assigns an index to a task prior to storing task context in a context memory accessible to both the task issuer and the protocol engine and issuing the task to the protocol engine.

13 Claims, 7 Drawing Sheets

U.S. PATENT DOCUMENTS

| | | | |
|---|---|---|---|
| 2004/0073719 | A1 | 4/2004 | Grimsrud et al. |
| 2004/0100944 | A1 | 5/2004 | Richmond et al. |
| 2004/0205259 | A1 | 10/2004 | Galloway |
| 2004/0252716 | A1 | 12/2004 | Nemazie |
| 2004/0268169 | A1 | 12/2004 | Bashford et al. |
| 2005/0015532 | A1 | 1/2005 | Beckett et al. |
| 2005/0102474 | A1 | 5/2005 | Lakshmanamurthy et al. |
| 2005/0138191 | A1 | 6/2005 | Seto et al. |
| 2005/0138202 | A1 | 6/2005 | Seto |
| 2005/0149656 | A1 | 7/2005 | Seto |
| 2005/0235072 | A1* | 10/2005 | Smith et al. .................. 710/22 |
| 2006/0004935 | A1 | 1/2006 | Seto et al. |
| 2006/0041691 | A1 | 2/2006 | Bashford et al. |
| 2006/0047904 | A1 | 3/2006 | Rohde et al. |
| 2006/0064568 | A1 | 3/2006 | Seto et al. |
| 2006/0155944 | A1 | 7/2006 | Kano |
| 2006/0294286 | A1 | 12/2006 | Duerk et al. |
| 2006/0294344 | A1 | 12/2006 | Hsu et al. |
| 2007/0002827 | A1 | 1/2007 | Lau et al. |
| 2007/0005838 | A1 | 1/2007 | Chang et al. |
| 2007/0005850 | A1 | 1/2007 | Chang et al. |
| 2007/0005896 | A1 | 1/2007 | Chang et al. |
| 2007/0005898 | A1 | 1/2007 | Halleck et al. |
| 2007/0006235 | A1 | 1/2007 | Chang et al. |
| 2007/0011333 | A1 | 1/2007 | Lau et al. |
| 2007/0011360 | A1 | 1/2007 | Chang et al. |
| 2007/0067504 | A1 | 3/2007 | Lau et al. |
| 2007/0073923 | A1 | 3/2007 | Vemula et al. |

FOREIGN PATENT DOCUMENTS

| | | | |
|---|---|---|---|
| WO | WO-2007002804 | A3 | 1/2007 |

OTHER PUBLICATIONS

"Response to Non-Final Office Action for U.S. Appl. No. 11/172,715, filed Feb. 13, 2008", 12 Pages.

"Non-Final Office Action for U.S. Appl. No. 11/172,627, mailed on Sep. 20, 2007", (19 Pages).

"Response to Non-Final Office Action for U.S. Appl. No. 11/172,627, filed Jan. 25, 2008", 20 Pages.

Intel Corporation, et al., "Serial ATA Native Command Queuing", XP-002428259, *Joint Whitepaper by Intel Corporation & Seagate Technology*, (Jul. 2003), the whole document, 12 pages.

Intel Corporation, "Serial ATA II Native Command Queuing Overview, Application Note", www.intel.com/design/storage/papers/252664.htm. retrieved on Nov. 28, 2006, the whole document, (Apr. 30, 2003),21 pages.

APT Technologies, Inc, et al., "Serial ATA: High Speed Serialized AT Attachment", *Revision 1.0a*, (Jan. 7, 2003),pp. 1-2, 184-236.

Intel Corporation, "Comparing Serial ATA Native Command Queuing (NCQ) and ATA Tagged Command Queuing (TCQ)", *The Advantage of Serial ATA Native Command Queuing*, (Oct. 2003),pp. 1-4.

"Final Office Action for U.S. Appl. No. 11/172,627, mailed on May 1, 2008", 14 Pages.

"Final Office Action for U.S. Appl. No. 11/170,872, mailed on Sep. 28, 2007", 21 Pages.

"Final Office Action for U.S. Appl. No. 11/172,715, mailed on Apr. 3, 2008", 26 Pages.

"Notice of Allowance for U.S.. Appl. No. 11/171,960, mailed on Jan. 7, 2008", 4 Pages.

"Notification of Transmittal of International Preliminary Examination Report, International Application No. PCT/US2006/025352".

"PCT/US2006/025462 Search Report", (Nov. 14, 2006),2 pages.

"PCT/US2006/025461 International Search Report", 1 page.

"PCT/US2006/025750 Search Report", (Apr. 23, 2007),2 pages.

"PCT/US2006/025753 Search Report", 2 pages.

"Non-Final Office Action for U.S. Appl. No. 11/171,960, mailed on Jul. 2, 2007", 8 Pages.

"Response to Non-Final Office Action for U.S. Appl. No. 11/171,960, filed Oct. 2, 2007", 10 Pages.

"Non-Final Office Action for U.S. Appl. No. 11/170,872, mailed on Jun. 22, 2007", 22 Pages.

"Response to Non-Final Office Action for U.S. Appl. No. 11/170,872, filed Aug. 10, 2007", 12 Pages.

"Non-Final Office Action for U.S. Appl. No. 11/240,177, mailed on Feb. 6, 2008", 9 Pages.

"Response to Non-Final Office Action for U.S. Appl. No. 11/240,177, filed Feb. 22, 2008", 11 Pages.

* cited by examiner

US 7,676,604 B2

TASK CONTEXT DIRECT INDEXING IN A PROTOCOL ENGINE

FIELD OF THE INVENTION

This disclosure relates to management of task context in a computer system.

BACKGROUND

Storage communication protocols such as the Serial Attached Small Computer Systems Interface (SAS) and Fibre Channel Arbitrated Loop (FCAL) provide a connection-oriented service with acknowledged delivery. A connection is established between devices prior to transfer of data between them. In the event that the connection is terminated, the connection must be re-established prior to resuming transfer of the data. The process for establishing the connection may require an exchange of frames between the devices.

There may be many simultaneous active connections requiring the management of thousands of task requests that are typically issued by a device driver in the operating system to a storage controller. A task represents the work associated with a command or group of linked commands. A context associated with the task is typically stored in a data structure and includes information required to process the task. The information may include the type of command to be issued and an identifier identifying the storage device to which the command is to be issued. One example of a task may be a command to write a file to a disk drive and the parameters of the command include a number of sectors to write on the disk drive.

As the issued task requests may be queued prior to being processed, each task request is typically assigned both an Input/Output (I/O) tag and a context identifier (ID) which are used to track the tasks. The context ID is typically assigned by hardware in the storage controller and used by the hardware to associate tasks with specific resources in the storage controller. The I/O tag is typically assigned by firmware in the storage controller and used by the firmware to identify the task. The context ID may be unrelated to the I/O tag.

A large task request queue is required in the storage controller to store the task requests and their associated context for all task requests issued to the storage controller. Furthermore, a request to abort or suspend a task issued by firmware in the storage controller requires finding a context ID associated with the I/O tag prior to processing the request. A list of tasks in process must be searched in order to find one with a matching I/O tag. This requires additional logic which is dependent on the number of tasks in progress.

An alternative to searching through a list of tasks is to have the hardware in the storage controller return the context ID assigned to each task when it accepts a task from firmware. The returned context ID is stored in a mapping table with the associated I/O tag. Instead of having to search through the entire list, the mapping table can be searched for a matching context ID. However, the return of a context ID for each task increases the number of accesses to the hardware that are performed for each task. Instead of two accesses, one to issue the request and the second to accept completion status, a third access is required by firmware to retrieve the context ID and store it in the mapping table with the I/O tag. Furthermore, although the context ID is rarely used this third access is required for each task in case the context ID is needed by the firmware to abort or suspend a task.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
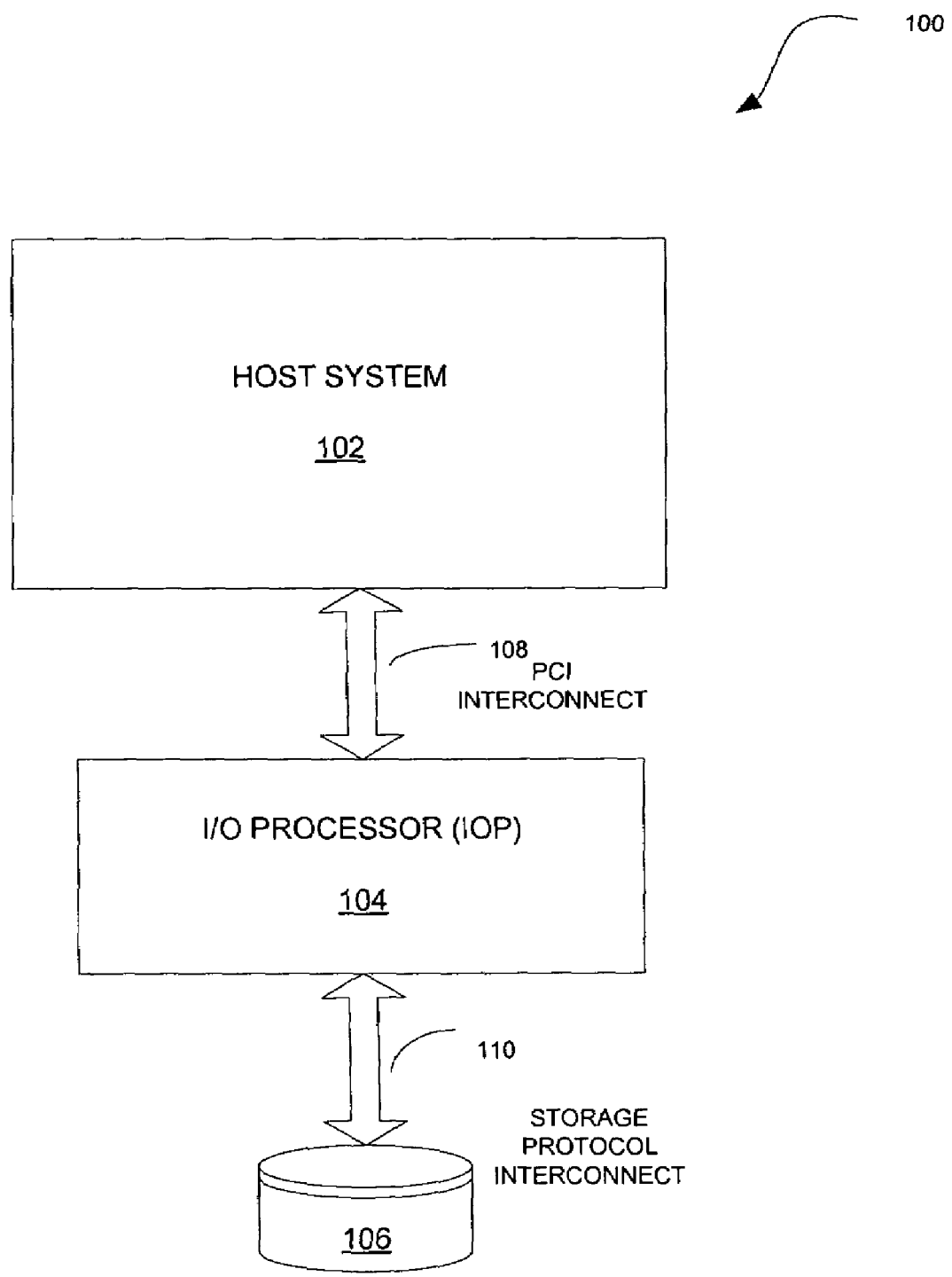
FIG. 1 is a block diagram of a system including an input output processor (IOP) which manages tasks to be processed by at least one storage device according to an embodiment of the present invention.

FIG. 1 is a block diagram of a system 100 including an input output processor (IOP) 104 which manages tasks to be processed by at least one storage device according to an embodiment of the present invention. The system 100 includes a Host System 102 which may be coupled to the IOP 104 using a Peripheral Component Interconnect (PCI) interconnect 108, for example, an interconnect such as PCI Express (PCIe). A version of PCI Express is described in the PCI Express Specification, Revision 1.0a.—PCI Special Interest Group. The Host system 102 may include a Central Processing Unit (CPU), a Host Chip set (MCH) and memory.

The IOP 104 receives task requests from a device driver in an operating system that executes in memory in a Host System 102 for a storage device 106 coupled to the IOP 104. A task represents the work associated with a command or group of linked commands. The IOP 104 processes each task request that it receives, stores a context associated with the task request together with the task request in a queue of tasks and returns status of the task request when completed by the storage device 106.

The IOP 104 may communicate with the storage device 106 over a storage protocol interconnect—110 using a serial attached storage protocol. Typically, in a serial attached storage protocol, communication is between an initiator (originator) and a target (responder). The initiator may be a storage protocol controller such as a Host Bus Adapter (HBA) and the target may be a storage device, for example, a disk drive, Digital Video Disk (DVD) drive, compact disk (CD) drive, Redundant Array of Independent Disks (RAID), or tape drive.

Commands, data and status information encapsulated in frames are exchanged between the initiator and the target, over storage protocol interconnect 110 using standard serial attached storage protocol suites.

There are many standard serial attached storage protocol suites such as, Fibre Channel protocol (FCP), Serial Attached Small Computer System Interface (SAS) and Serial Advanced Technology Attachment (SATA). A version of the Fibre Channel (FC) standard is described in the American National Standards Institute (ANSI) Standard Fibre Channel Physical and Signaling Interface-2 (FC-FS-2) Aug. 9, 2005 Specification. A version of the Fibre Channel Protocol (FCP-3) standard which defines a mapping protocol for applying the Small Computer System Interface (SCSI) command set to Fibre Channel is described in Information technology—Fibre Channel Protocol for SCSI, Third Version (FCP-3) Revision 4, Sep. 13, 2005 American National Standards Institute (ANSI) (hereinafter termed the "FCP standard"). A version of the SATA protocol is described in "Serial ATA: High Speed Serialized AT Attachment," Revision 1.0a, published on Jan. 7, 2003 by the Serial ATA Working Group (hereinafter termed the "SATA standard"). A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by ANSI (hereinafter termed the "SAS Standard"). The SAS protocol may comprise Serial Attached Technology Attachment (SATA) Tunneled Protocol (STP), Serial Management Protocol (SMP) and Serial SCSI Protocol (SSP).

Figure 2:
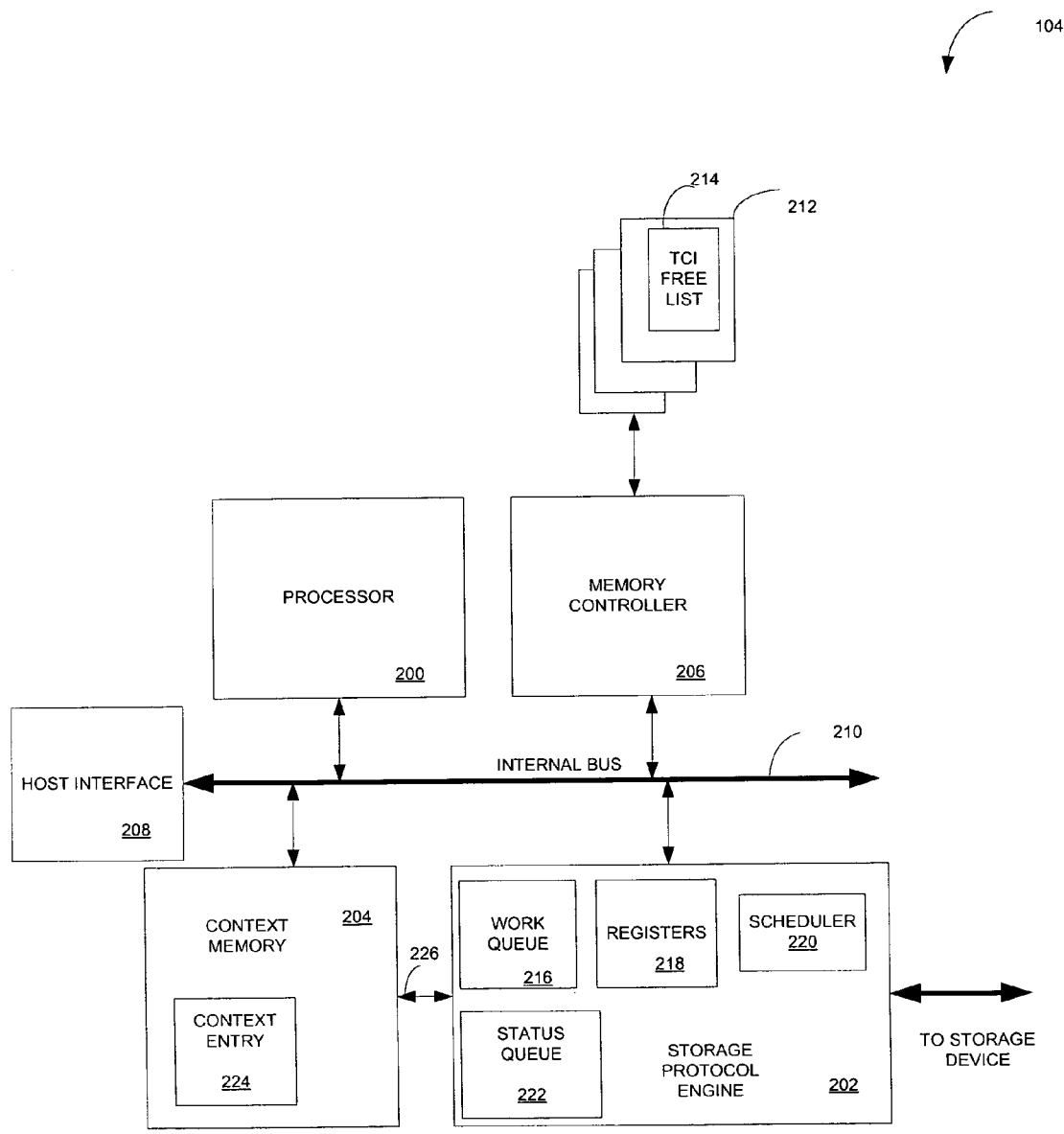
FIG. 2 is a block diagram of an embodiment of the IOP shown in FIG. 1.

FIG. 2 is a block diagram of an embodiment of the IOP 104 shown in FIG. 1. The IOP 104 includes a processor 200, storage protocol engine 202, context memory 204, a host interface 208 and a memory subsystem. The memory subsystem includes a memory controller 206 and memory 212 that is accessible by the processor. The host interface 208 allows the host system 102 (FIG. 1) and the processor 200 to communicate through message passing and interrupt generation. In an embodiment, the memory 212 in the memory subsystem may be Double Data Rate Synchronous Dynamic Random Access Ram (DDR SDRAM) and the processor 200 may be an Intel XScale® core.

An engine is a processor or portion of a program that manages and manipulates data. The storage protocol engine 202 manages one of a plurality of serial storage protocols, for example, SSP, FCP, Internet SCSI (iSCSI) or SATA. The IOP 104 may have multiple storage protocol engines with each supporting a different storage protocol. All of the storage protocol engines may be enabled for processing frames at the same time or only one of the plurality of protocol processing engines may be enabled. In the embodiment shown in FIG. 2, there is only one protocol processing engine 202.

A work queue 216 in the storage protocol engine 202 and a context memory 204 are used to manage task context according to an embodiment of the present invention. The task context may be used to identify where the results of a completed task are to be returned and may also include information needed to execute the task such as, the type of task to execute, information identifying a storage device to which the task is directed and other parameters of the task. An embodiment of a task context is described later in conjunction with FIG. 6.

The work queue 216 in the storage protocol engine 202 stores tasks to be processed by the storage protocol engine 202. In an embodiment, the work queue is a First In First Out (FIFO) that can be accessed by the processor 200 via the internal bus. Tasks are added to the work queue 216 by the processor 200 and removed from the work queue by the storage protocol engine 202. Each entry in the work queue 216 includes a task request. In addition to the task request, a task entry includes a task context index (TCI) or task identifier that is used by the storage protocol engine 202 for processing tasks on the task queue. An embodiment of the work queue entry stored on the work queue will be described later in conjunction with FIG. 6

Upon initialization, based on available context memory 204, the storage protocol engine 202 determines the number of context resources that are available to handle tasks. This number is stored in a context resources register 218 in the storage protocol engine 202 that is accessible to the processor 200 over the internal bus 210. The context resources register 218 may be one of a plurality of registers in the storage protocol engine that are accessible by the processor 200.

The processor 200 executes firmware, that is, software routines that are stored in a memory 212 accessible by the processor 200. While executing the firmware, the processor 200 accesses the context resources register 218 in the storage protocol engine 202 to determine the number of context entries in context memory 204 before adding a first task request to the work queue 216 in the storage protocol engine 202. A free list of available TCIs is created within the range defined by the context resources register and this TCI free list 214 is stored in memory 212.

To issue a task to the storage protocol engine 202, a TCI is obtained from the free list of available TCIs stored in memory 212 and the task request that includes the associated TCI is added to an entry in the work queue 216. A scheduler 220 in the storage protocol engine 202 accesses the entries in the work queue 216 to schedule tasks to be processed. In this embodiment, the firmware may be referred to as the issuer of the task request because it adds the task request to the work queue and the storage protocol engine may be referred to as the processor of the task request.

In an embodiment of the invention, the TCI is an index to a context entry 224 in context memory 204 that stores context associated with the task. In the embodiment shown, the context memory 204 is used exclusively for storing task context. In alternate embodiments, the context memory could also be used for storing other data or structures shared by the processor 200 and the storage protocol engine 202. The context resources register 218 in the storage protocol engine 202 stores the total number of context entries in the context memory 204. The context memory 204 is accessible by both the processor 200 over the internal bus 210 and by the storage protocol engine 202 over a separate bus 226. Requests for access to the context memory from the processor 200 and the storage protocol engine 202 are arbitrated by a context memory controller that controls access to the context memory.

In an embodiment in which the maximum number of context entries is N, the TCI ranges from 0-(N−1). In an embodiment, starting with all context entries in the context memory available, TCIs can be assigned to tasks in sequential order from 0-N. Although tasks are added to the work queue 216 by the processor in FIFO order, tasks can be scheduled by the scheduler 220 in the storage protocol engine 202 in an order determined by a scheduler. The scheduler 220 has an associated scheduler memory in the storage protocol engine that is neither visible nor directly accessible by the processor 200. Thus, the queued tasks will not necessarily complete in the same order that they were added to the work queue. As tasks complete, the TCI associated with the context entry of the completed task is added to the TCI free list 214 managed by the processor 200 so that the processor 200 can assign free context entries in the context memory 204 to new tasks.

When there are no available context entries, task requests can be stored in a temporary buffer in memory 212 until one of the context entries in the context memory is freed and the TCI associated with the freed context entry is added to the TCI free list. This allows more than N tasks to be queued in the IOP although only N tasks can be pending in the storage protocol engine 202.

Figure 3:
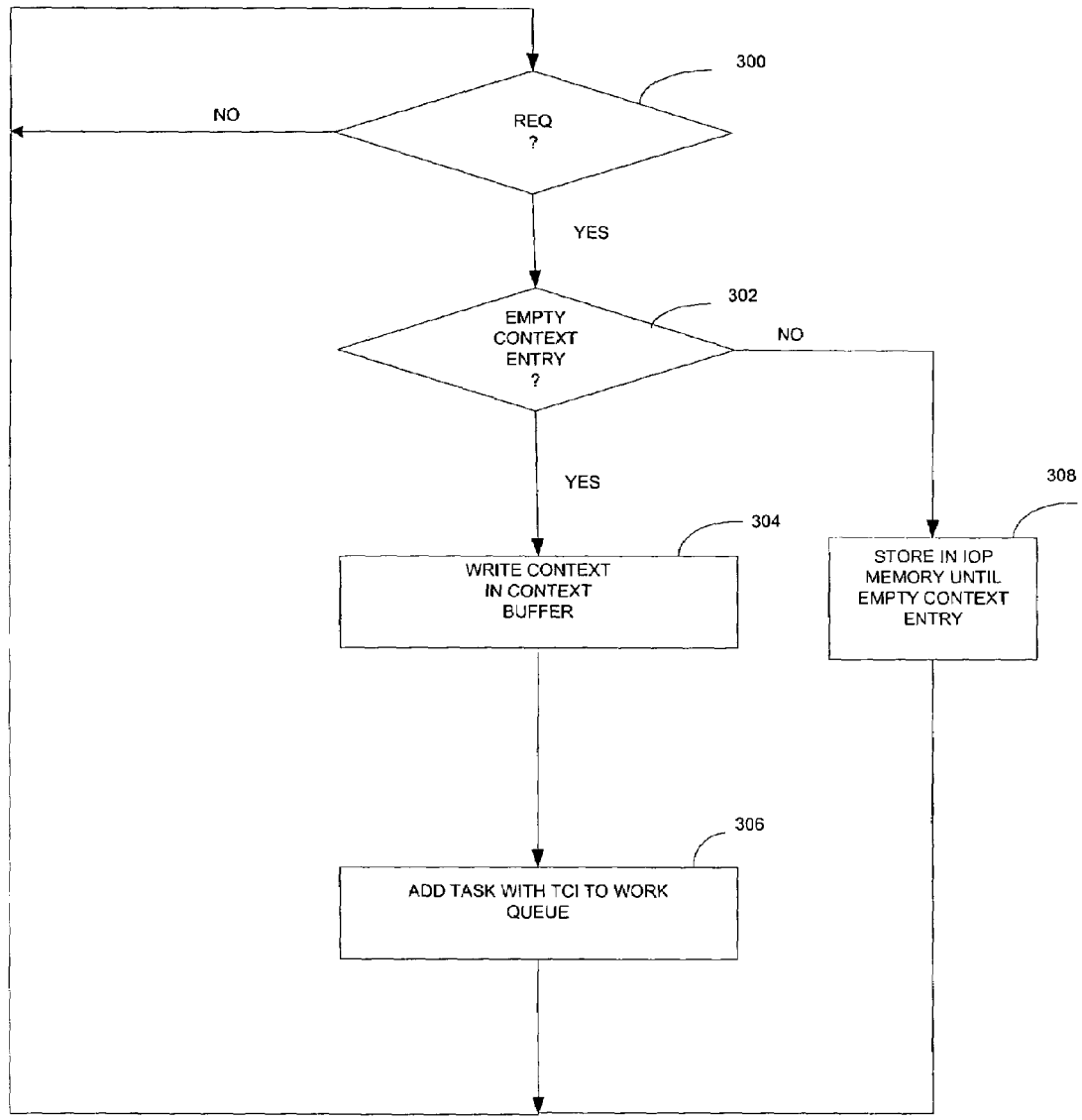
FIG. 3 is a flow chart illustrating a method for issuing task requests implemented in the IOP shown in FIG. 2.

A task flow for issuing a task request to the storage protocol engine 202 is described in conjunction with the flow diagram shown in FIG. 3. FIG. 3 will be described in conjunction with FIG. 2.

At block 300, the IOP waits for a task request. The task request may be a new request or a waiting request that is stored in the IOP waiting for an empty context entry. Upon receiving a task request, processing continues with block 302.

At block 302, the TCI free list 214 stored in memory 212 in the IOP 104 is checked to determine if there is an empty context entry in context memory. A TCI in the TCI free list 214 indicates that there is an empty context entry indexed by the TCI that is available in the context memory 204 for storing context associated with a new task. If so, processing continues with block 304. If not, in an embodiment, at block 308, the task request is stored in a queue in memory 212 until a context entry in the context memory 204 is freed by a completed task.

At block 304, a TCI is selected for the task from the TCI free list 214 stored in memory 212 in the IOP. In an embodiment the TCI free list 214 is implemented as a First In First Out list of available TCIs. The context associated with the task is written in a context entry identified by the provided TCI in the context memory 204.

At block 306, the task is issued to the storage protocol engine 202 with the associated TCI. To issue the task to the storage protocol engine, the task request and associated TCI is written to an entry in the work queue 216 in the storage protocol engine 202 and the work queue entry is marked valid. The TCI is also stored in memory 212 together with information regarding the task in a list of tasks in progress. Processing continues with block 300 to wait for a new task request.

A scheduler 220 in the storage protocol engine 202 takes a task request from the work queue 216 and uses the TCI in the work queue entry to reference the context memory 204 to extract parameters required for the task from the context associated with the task that is identified by the TCI. The scheduler 220 schedules the task to lower layers of the storage protocol, that is, the transport, link and physical layers that are handled by the storage protocol engine 202.

Upon completion of the task, the task is placed on a status queue 222 with the associated TCI. For each completed task, the processor 200 returns the TCI to the TCI free list 214 when it no longer requires the context associated with the TCI.

Figure 4:
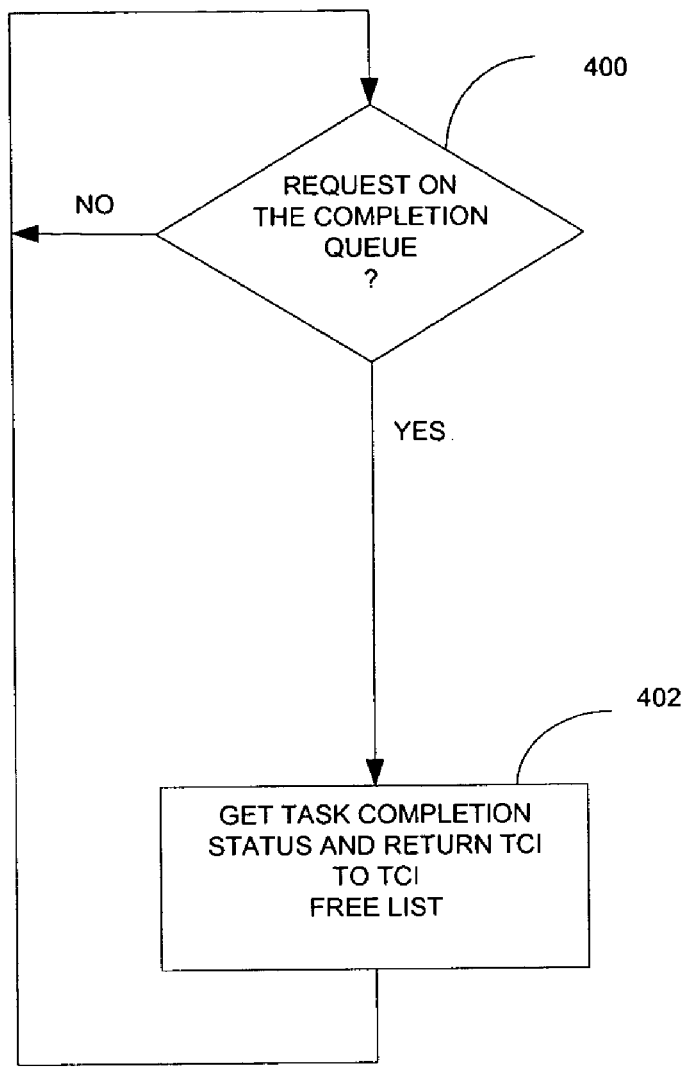
FIG. 4 is a flow chart illustrating a method for processing completed task requests implemented in the IOP shown in FIG. 2.

A task flow for handling completion of a task request is described in conjunction with the flow diagram shown in FIG. 4. FIG. 4 will be described in conjunction with FIG. 2.

At block 400, a status queue 222 in the storage protocol engine 202 is checked to determine if any tasks have completed. If so, processing continues with block 402 to handle the completed task.

At block 402, the TCI is stored on the status queue 222 with the status of the completed task. The status of the completed task may be successful, unsuccessful or aborted. The TCI is returned to the TCI free list 214 to be used when adding a new task to the work queue 216 in the storage protocol engine.

Figure 5:
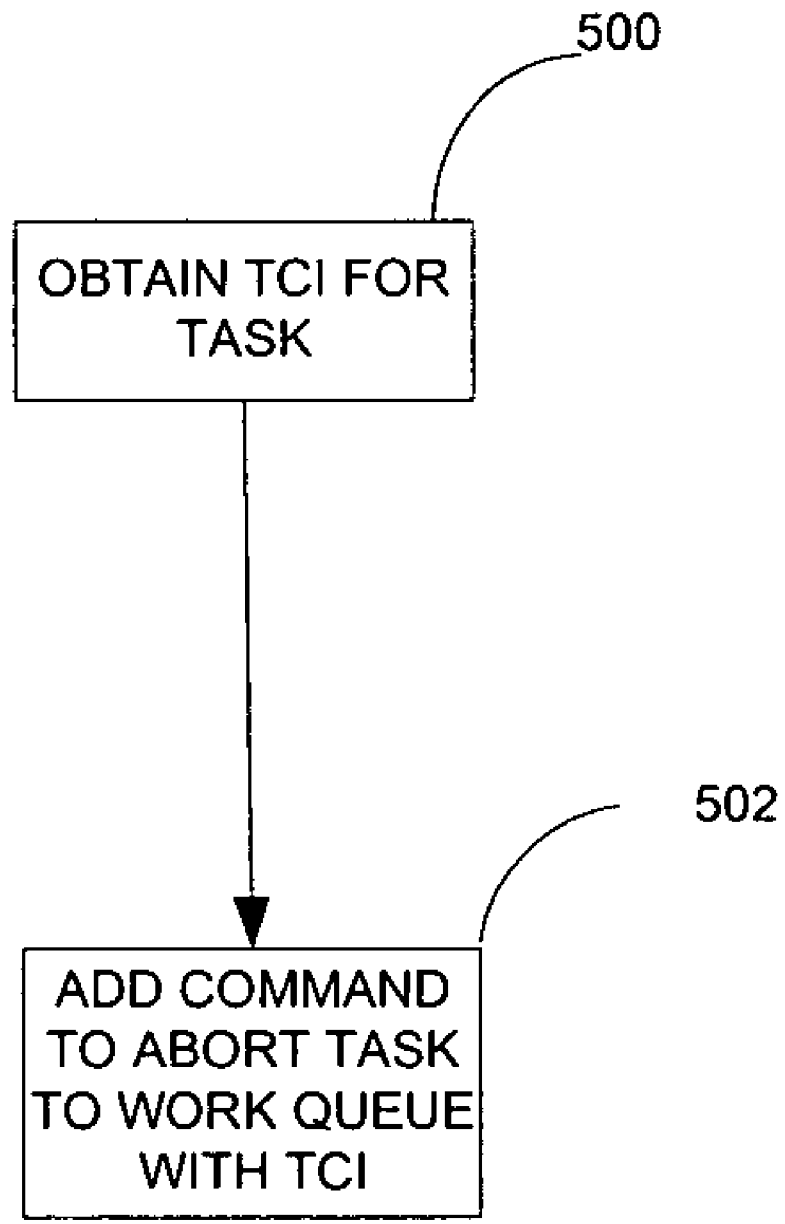
FIG. 5 is a flow chart illustrating a method for aborting issued tasks implemented in the IOP shown in FIG. 2.

A task flow for handling a task abort is described in conjunction with the flow diagram shown in FIG. 5. FIG. 5 will be described in conjunction with FIG. 2.

At block 500, the TCI assigned to the task to be aborted prior to adding the task to the work queue 216 is obtained from a list of tasks in progress that are stored in memory 212.

At block 502, a command to abort the task along with the TCI associated with the task is added to the work queue 216. When the abort command is complete, the status of the task abort command is added to the status queue and handled as described in conjunction with FIG. 4.

Figure 6:
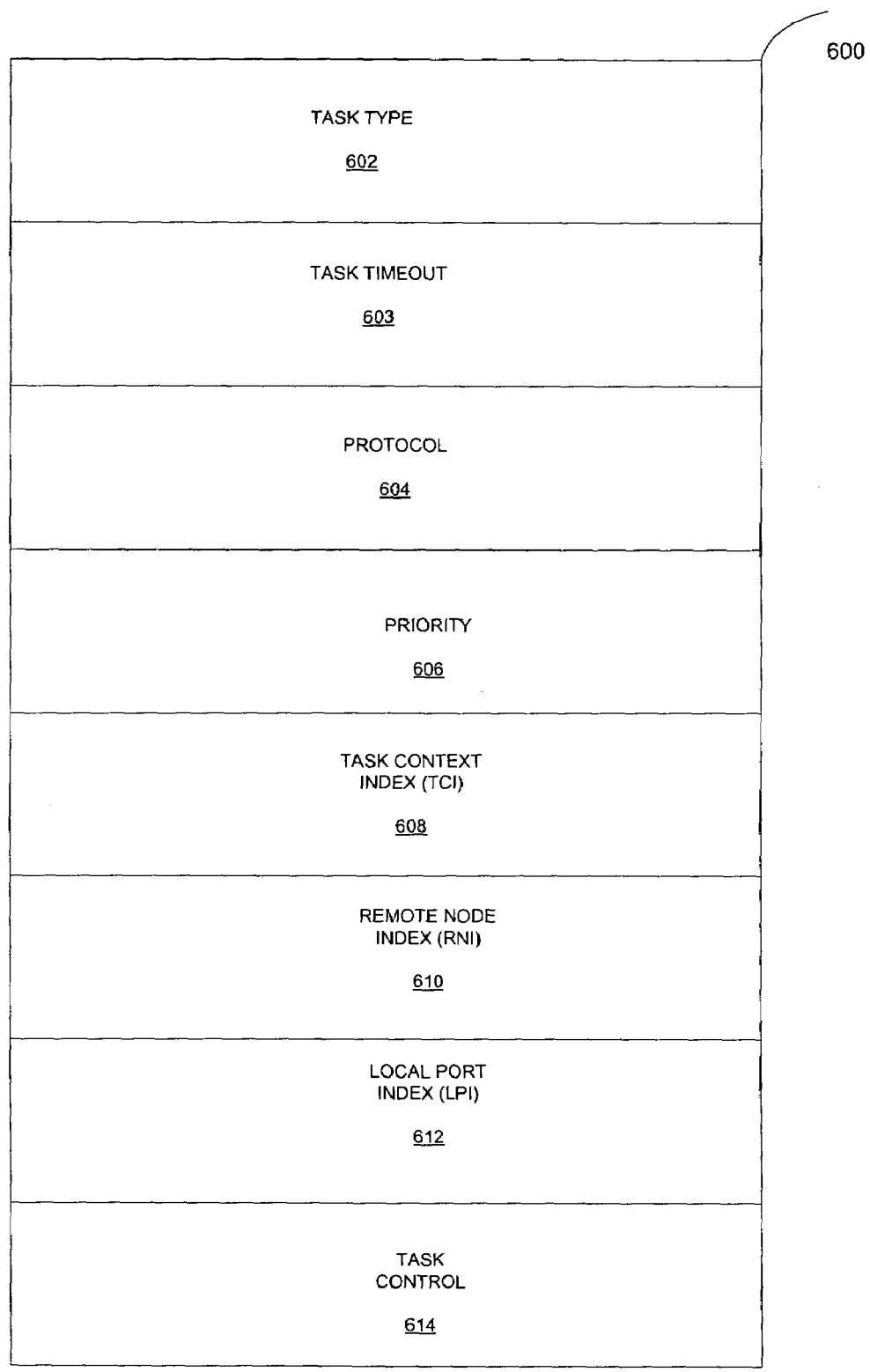
FIG. 6 is a block diagram of an embodiment of a task context for a frame transmission task stored in a work queue in the work queue 216 shown in FIG. 2.

FIG. 6 is a block diagram of an embodiment of a task context for a frame transmission task 600 stored in a work queue entry in the work queue 216 shown in FIG. 2. The frame transmission task includes a task type field 602 for storing a task type that indicates the type of task which in this case is a frame transmission task. The task type may be a link specific task type, context management task type, link control task type, protocol engine control task type or other task type. The task timeout field 603 stores a relative timeout value associated with the frame transmission task.

The frame transmission task also includes a protocol field 604 which identifies the serial storage protocol to be used by the storage protocol engine for the task. The protocol may be SSP, STP/SATA, FC or other serial storage protocol. The priority field 606 stores an indication of the priority, for example, high or low, of the task. The TCI field 608 stores the TCI associated with the task that identifies the context entry in context memory for storing context for the task. The Remote Node Index (RNI) field 610 and the Local Port Index (LPI) field 612 store indices to where information for the remote node and local port are stored. The task control field 614 stores control information about the task, for example, whether the task is an initiator task or a target task and whether the type of operations that it involves, for example, read, write or read-write operations.

Figure 7:
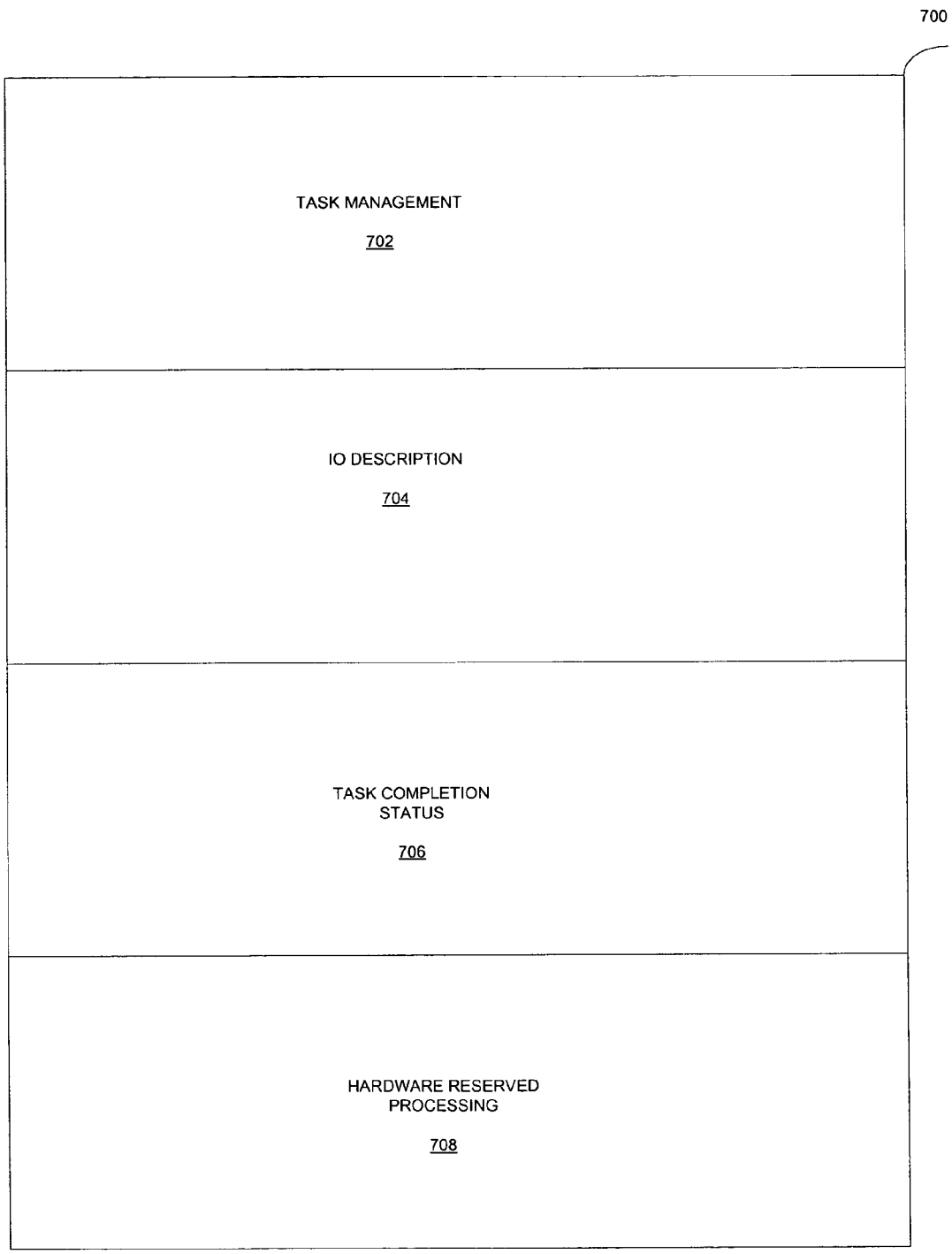
FIG. 7 is a block diagram of an embodiment of a context entry in context memory for storing context for the frame transmission task shown in FIG. 6.

FIG. 7 is a block diagram of an embodiment of a context entry 700 in context memory for storing context for the frame transmission task shown in FIG. 6. The context includes information for task management that is stored in a task management portion 702 of the context entry. The task management information includes information provided in the work queue entry, for example, task type 602 (FIG. 6), protocol 604 (FIG. 6) and TCI 608 (FIG. 6). The 10 description portion 704 of the context entry stores information about the frame transmission task such as the IO class (read, write or read/write), the block size, staffing Logical Block Address (LBA), transfer size and endian control (big or little). The task completion status portion 706 of the context entry stores completion status for the task. The hardware reserved processing portion 708 of the context entry stores hardware states.

Through the context resources register, the processor 200 can learn the available resources in the storage protocol engine 202 without requiring knowledge of the actual implementation. Furthermore, the use of the TCI reduces the handshaking commands required between the processor and the storage protocol engine for assigning a task over other methods which require passing a context identifier back to the processor for use in identifying the context associated with the task. The handshaking is reduced because the TCI is used by both the storage protocol engine and the processor to keep track of tasks that are in process.

Additionally, by sharing the same tag, that is, the TCI between the processor and the storage protocol engine, there is no need for a search mechanism (mapping table) as in prior art methods in order to match a context identifier assigned by the storage protocol engine with an I/O tag.

With the processor assigning context IDs prior to issuing the task to the storage protocol engine, the task context may be built into a context memory buffer associated with a TCI prior to issuing the task request to the storage protocol engine 202. Thus, there is no longer any need to include the entire task context along with the task request on the work queue, reducing the size of the work queue buffer. An embodiment of the invention has been described for a task request issued to a storage device. However, embodiments of the present invention are not limited in this respect. Embodiments of the invention may be used for other applications that require the management of a context associated with tasks being performed.

It will be apparent to those of ordinary skill in the art that methods involved in embodiments of the present invention may be embodied in a computer program product that includes a computer usable medium. For example, such a computer usable medium may consist of a read only memory device, such as a CD ROM disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising: a storage protocol engine that comprises a queue for storing in an entry in the queue both a task request and a task context index, the task request being to request a task; and a context memory coupled via a bus to the storage protocol engine and for storing in a respective entry in the context memory a context associated with the task request, the task context index identifying both the task and a context associated with the task to both an issuer of the task request and a processor of the task request; the issuer of the task request to write to the context memory; the context associated with the task request being stored in the context memory and including a protocol field that identifies a selected storage protocol from a plurality of storage protocols, the selected storage protocol to be used by the storage protocol engine for the task, the storage protocol engine and the context memory being comprised in an input/output (I/O) processor coupled to a host system, the host system including a central processing unit, the context associated with the task request also including the task context index, completion status for the task, and a task type field, the task type field identifying a selected task type for the task from a plurality of possible task types, the plurality of possible task types including: a frame transmission task type, a context management task type, and a protocol engine control task type; the task request, as stored in the queue, including a task timeout field, the task type field, and the protocol field, the task timeout field storing a relative timeout value for the task; the task context index being an index to the respective entry in the context memory that stores the context associated with the task request, the context memory being used exclusively for task context storage; a free list of task identifiers for identifying available context entries in the context memory, wherein the free list is managed by the issuer of the task request; and wherein the issuer of the task request writes the context directly to the context memory in the entry identified by the task context index prior to adding the task request to the queue.

2. The apparatus of claim 1, further comprising:
a register writable by the processor of the task and readable by the issuer of the task request for storing a maximum number of contexts that can be stored in the context memory.

3. The apparatus of claim 1, wherein the issuer of the task request assigns the task context index.

4. The apparatus of claim 1, wherein the task request includes the task to be processed.

5. A method for managing task context comprising: storing in an entry in a queue in a storage protocol engine both a task request and a task context index, the task request being to request a task; storing in a respective entry in a context memory a context associated with the task request, the context memory being coupled via a bus to the storage protocol engine; and the index identifying both the task request and the context associated with the task request to both an issuer of the task request and a processor of the task request; the issuer of the task request to write to the context memory; the context associated with the task request being stored in the context memory and including a protocol field that identifies a selected storage protocol from a plurality of storage protocols, the selected storage protocol to be used by the storage protocol engine for the task, the storage protocol engine and the context memory being comprised in an input/output (I/O) processor coupled to a host system, the host system including a central processing unit, the context associated with the task request also including the task context index, completion status for the task, and a task type field, the task type field identifying a selected task type for the task from a plurality of possible task types, the plurality of possible task types including: a frame transmission task type, a context management task type, and a protocol engine control task type; the task request, as stored in the queue, including a task timeout field, the task type field, and the protocol field, the task timeout field storing a relative timeout value for the task; the task context index being an index to the respective entry in the context memory that stores the context associated with the task request, the context memory being used exclusively for task context storage; wherein the issuer of the task request writes the context directly to the context memory in the entry identified by the task context index prior to adding the task request to the queue; and managing by the issuer of the task, a free list of task identifiers identifying available context entries in the context memory.

6. The method of claim 5, further comprising:
storing a maximum number of contexts that can be stored in the context memory in a register writable by the processor of the task and readable by the issuer of the task request.

7. The method of claim 5, wherein the issuer of the task request assigns the task context index.

8. The method of claim 5, wherein the task request includes the task to be processed.

9. A system comprising: a disk drive; a storage protocol engine and a context memory comprised in an input/output (I/O) processor coupled to the disk drive, the storage protocol engine being coupled via a bus to the context memory and comprising a queue for storing a task request, the task request including a command to be processed by the disk drive and a task context index, the I/O processor being coupled to a host system, the host system including a central processing unit; and a context memory for storing at an entry identified by the index a context associated with the task request, the index identifying both the task request and the context associated with the task request to both an issuer of the task request and the storage protocol engine; the issuer of the task request to write to the context memory; the context associated with the task request being stored in the context memory and including a protocol field that identifies a selected storage protocol from a plurality of storage protocols, the selected storage protocol to be used by the storage protocol engine for the task, the context associated with the task request also including the index, completion status for the task, and a task type field that identifies a selected task type for the task from a plurality of possible task types, the plurality of possible task types including: a flame transmission task type, a context management task type, and a protocol engine control task type; the task request, as stored in the queue, including a task timeout field, the task type field, and the protocol field, the task timeout field storing a relative timeout value for the task; the task context index being an index to the respective entry in the context memory that stores the context associated with the task request, the context memory being used exclusively for task context storage; wherein the issuer of the task request writes the context directly to the context memory in the entry identified by the task context index prior to adding the task request to the queue; and a free list of task identifiers for identifying available context entries in the context memory, wherein the free list is managed by the issuer of the task request.

10. The system of claim 9, wherein the storage protocol engine further comprises:
a register written by the processor of the task and readable by the issuer of the task request for storing a maximum number of contexts that can be stored in the context memory.

11. The system of claim 9, wherein the issuer of the task request assigns the task context index.

12. An article including a machine-accessible medium having associated information, wherein the associated information, when accessed, results in a machine performing: storing in a queue in a storage protocol engine both a task request and a task context index, the task request being to request a task; storing in an entry in a context memory identified by the index a context associated with the task request, the context memory being coupled via a bus to the storage protocol engine; and the index identifying both the task request and the context associated with the task request to both an issuer of the task request and a processor of the task request; the issuer of the task request to write to the context memory; the context associated with the task request being stored in the context memory and including a protocol field that identifies a selected storage protocol from a plurality of storage protocols, the selected storage protocol to be used by the storage protocol engine for the task, the storage protocol engine and the context memory being comprised in an input/output (I/O) processor coupled to a host system, the host system including a central processing unit, the context associated with the task request also including the task context index, completion status for the task, and a task type field that identifies a selected task type for the task from a plurality of possible task types, the plurality of possible task types including: a frame transmission task type, a context management task type, and a protocol engine control task type; the task request, as stored in the queue, including a task timeout field, the task type field, and the protocol field, the task timeout field storing a relative timeout value for the task; the task context index being an index to the respective entry in the context memory that stores the context associated with the task request, the context memory being used exclusively for task context storage; wherein the issuer of the task request writes the context directly to the context memory in the entry identified by the index prior to adding the task request to the queue; and a free list of task identifiers for identifying available context entries in the context memory, wherein the free list is managed by the issuer of the task request.

13. The article of claim 12, wherein the issuer of the task request assigns the task context index.

* * * * *

UNITED STATES PATENT AND TRADEMARK OFFICE
CERTIFICATE OF CORRECTION

| | |
|---|---|
| PATENT NO. | : 7,676,604 B2 |
| APPLICATION NO. | : 11/285825 |
| DATED | : March 9, 2010 |
| INVENTOR(S) | : William Halleck et al. |

Page 1 of 1

It is certified that error appears in the above-identified patent and that said Letters Patent is hereby corrected as shown below:

In column 9, line 11, in claim 9, delete, "flame" and insert -- frame --, therefor.

Signed and Sealed this

Twenty-fifth Day of May, 2010

David J. Kappos
*Director of the United States Patent and Trademark Office*